Jan. 31, 1939.        G. BRIGHT        2,145,581
BATTERY CHARGING RACK
Filed Oct. 29, 1935
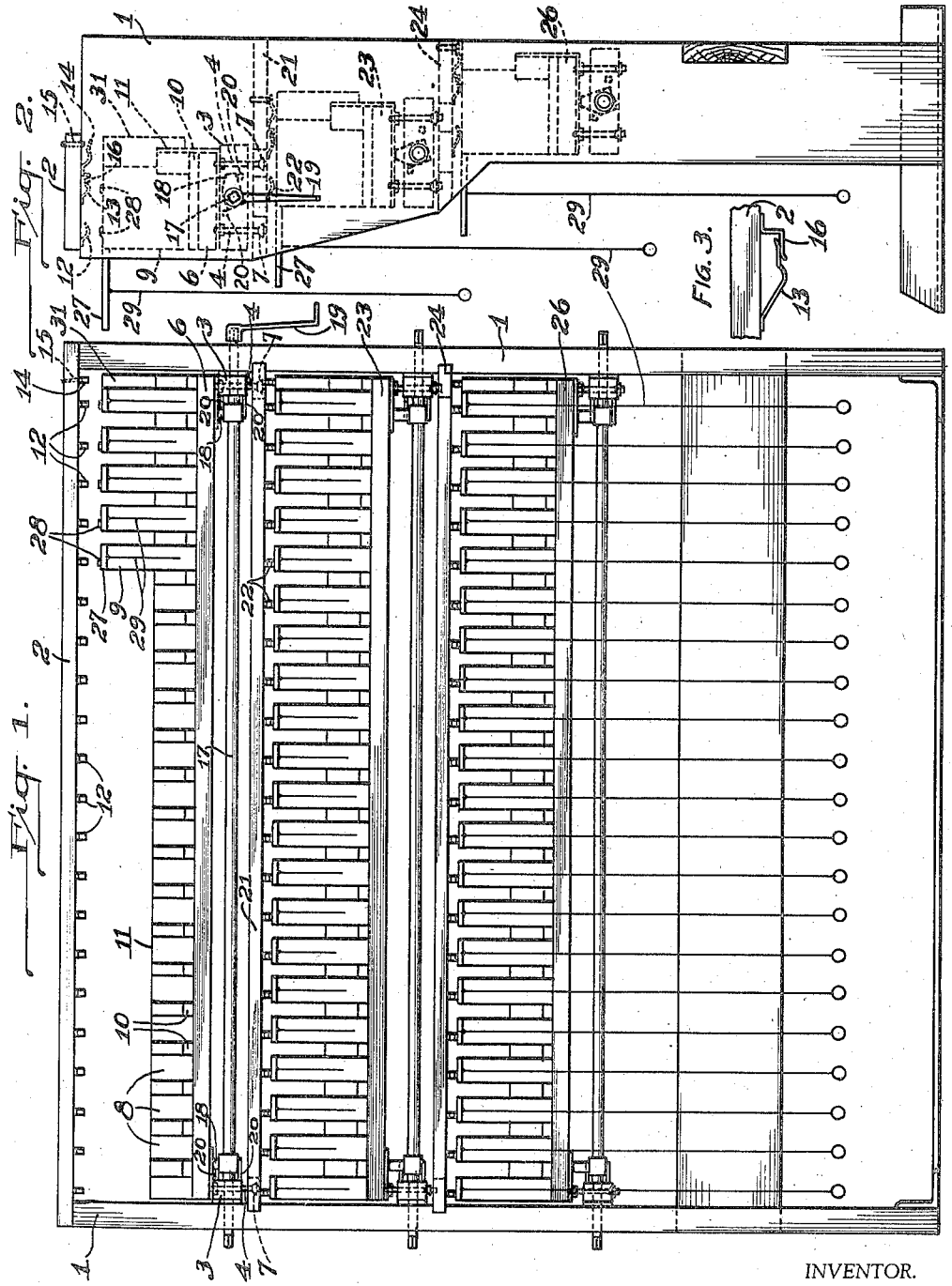
INVENTOR.
Graham Bright
BY Brown, Critchlow & Flick
his ATTORNEYS.
WITNESSES
A. B. Wallace.
V. A. Pickham.

Patented Jan. 31, 1939

2,145,581

UNITED STATES PATENT OFFICE 2,145,581

BATTERY CHARGING RACK

Graham Bright, Pittsburgh, Pa., assignor to Mine Safety Appliances Company, Pittsburgh, Pa., a corporation of Pennsylvania Application October 29, 1935, Serial No. 47,269

2 Claims. (Cl. 136—173)

This invention relates to battery charging racks such as those in which batteries for miners' lamps are charged.

In leaving a mine at the end of a working shift it is the general practice for the miners to leave the batteries which furnish the current for their electric lamps at a charging station or lamp house where they are recharged until the shift returns to work. In the past it has generally been necessary for one or more special workmen to receive the batteries from the miners, unlock them, and place them in the charging rack, because it required more care to properly position the batteries in the rack than the miners who were hurryig away from work could give them, and if the batteries were not properly positioned they were not charged.

When a miner went on shift he usually passed by a window in the lamp house where one of the special workmen, having removed the miner's lamp from the charging rack, locked it and handed it to the miner. The lamps and racks are usually numbered so that miner gets the same lamp every day.

It is among the objects of this invention to provide a miner's battery charging rack of simple and durable construction in which batteries can be quickly and accurately positioned by the miners themselves, and in which the rows of batteries do not interfere with each other.

The preferred embodiment of the invention is illustrated in the accompanying drawing, in which Fig. 1 is a front view of a charging rack; Fig. 2 is an end view thereof; and Fig. 3 is an enlarged detail showing one of the rear electric contacts.

Referring to the drawing, a frame is provided having upright end pieces 1 connected at the top by a horizontal cross member 2. Mounted on the inner faces of the end pieces below the horizontal cross member are brackets 3 provided with vertical openings therethrough. Slidably disposed in these openings are pins 4 which are rigidly connected at their upper ends to the opposite ends of a vertically movable shelf 6 above the brackets. The lower ends of the pins are threaded and provided with nuts 7 for anchoring the shelf to the frame.

The top of the shelf is provided with a plurality of battery-receiving areas, preferably in the form of recesses 8 each of which is open at the top and front for snugly receiving a battery 9. The recesses are formed by horizontally spaced strips 10 attached to the shelf transversely thereof, and a vertical backing strip 11 attached to the rear ends of the transverse strips. Above each recess front and rear electric contacts 12 and 13, respectively, preferably of flat spring form, are connected to the bottom of horizontal cross member 2. These contacts are connected by wiring (not shown) to a switch at one end of the cross member, the movable member of the switch being a flat spring contact 14 which in its unstressed position is spaced from the fixed contact 15 of the switch. This switch is connected in any convenient manner to a source of electricity which is suitable for charging batteries 9.

The wiring is such that when the batteries engage the front and rear contacts those contacts and the batteries are connected in series throughout the length of a shelf. Therefore, to prevent the absence of a battery from one of the recesses 8 from breaking the circuit, each contact 13 in its unstressed position engages a fixed contact 16, as shown in Fig. 3, projecting below it and likewise mounted on cross member 2. Each contact 16 is wired to contact 12 in front of it so as to conduct electricity from front contact 12 to the rear contact 13 when there is no battery in engagement with the latter two contacts, whereby the circuit is not broken by the absence of a battery.

In its lower position, in which shelf 6 rests on brackets 3 as shown, the tops of the batteries disposed in recesses 8 are spaced from electric contacts 12 and 13. To raise the shelf to bring the batteries into engagement with the contacts, a shaft 17 is journaled in the brackets with its ends projecting through the upright end pieces of the frame. Mounted on this shaft near each end is a cam 18 that engages the bottom of the shelf, and when the shaft is turned by a crank 19 to the left, as seen in Fig. 2, the cams raise the shelf. Movement of the cams is restricted by pins 20 projecting inwardly from the brackets. The crank is removable from the end of the shelf so that after a shelf full of batteries has been elevated into charging position the shelf can not be accidentally lowered. Pins 4 guide the shelf in its vertical movement so that it will move straight up and down.

Below the cam shaft a second horizontal cross member 21 is mounted in the frame. This member also carries a plurality of electric contacts 22 on its lower side above a second vertically movable shelf 23 which is offset rearwardly of top shelf 6. This shelf is of the same form as the top shelf, and is elevatable at will in the same manner. Below shelf 23 is a third contact-carrying cross member 24 below which a third vertically movable shelf 26 is disposed. This bottom shelf is offset rearwardly of the middle shelf. Any convenient number of shelves can be disposed in the frame in this manner.

When a group of miners returns from work at the end of a shift they unlock their batteries and file past the charging rack, and each successive miner turns back the cover 27 of his battery to expose terminals 28 and then slides the battery into a battery-receiving recess in one of the shelves. The battery covers project from the front of the rack and the lamp cords 29 hang straight down from the covers as shown in Fig. 2. Due to each shelf being offset rearwardly of the one above, the lamp cords can all hang straight down past the covers of the batteries below and without becoming tangled with the cords of the lower batteries. After all of the batteries have been placed in the rack the lamp man turns each cam shaft by means of crank 19 and thereby raises the shelves until battery terminals 28 engage the electric contacts on the cross member above. Variations in height of the batteries are taken care of by the resiliency of the contacts. The bottom and middle shelves are shown filled with batteries and in raised position.

Each shelf is provided at one end below switch contact 14 with a block 31 of such height that it does not touch the switch contact when the shelf is in its lower position, but engages the contact and pushes it up into engagement with fixed contact 15 when the shelf is raised. Thus, the circuit to electric contacts 12 and 13 is closed at the same time that the batteries are brought into engagement with them.

After the batteries have been fully charged, the shelves are dropped to their lower positions and the charging circuit is opened. The batteries can then be easily removed from the rack since there is no interference between the battery contacts and rack contacts 12 and 13. The miners going on shift file past the charging rack where each miner selects his own battery, removes it from the rack and closes and locks the cover, and proceeds into the mine. Since all electric contacts 13 engage contacts 16 to thereby maintain a closed circuit when all of the batteries are moved out of engagement with them, if it were not for the fact that when the shelf is lowered switch contact 14 moves away from contact 15 and cuts off the supply of current to the rack contacts there would be a short circuit that would blow the fuses.

Batteries can be quickly deposited in this rack in proper position because all that it is necessary to do is to slide them into their recesses. This is easy to do because at that time the shelves are in their lower positions so that there is ample room for depositing batteries on the shelves, and when a battery is slid or set in a recess and pushed to the back of it it is certain to engage the electric contacts above it when the shelf is raised. An advantageous result is that special workmen are not required for taking the batteries from the miners and placing them in the rack at the end of a shift, and for removing them from the rack and handing them out to the miners at the beginning of a shift. Due to the staggered arrangement of shelves a great many batteries can be charged in a single rack without the lamp cords becoming tangled.

According to the provisions of the patent statutes, I have explained the construction and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A battery charging rack for miners' lamp batteries comprising a frame having a plurality of vertically spaced horizontal cross members, a vertically movable shelf mounted in the frame below each of said cross members, each of said shelves being offset rearwardly of the shelf above it, the top of each of said shelves being provided with a plurality of recesses for freely receiving the bottoms of said batteries, a plurality of electric contacts mounted on the bottom of each of said cross members above the battery recesses directly below, and means for elevating each shelf to bring the terminals of batteries disposed in said recesses into engagement with the contacts on the cross member directly above.

2. A battery charging rack comprising a frame having a horizontal cross member, a vertically movable shelf mounted in the frame below said cross member, the top of said shelf being provided with a plurality of battery-receiving recesses, a plurality of electric contacts mounted on the bottom of said cross member above said recesses, a shaft journaled in said frame below the shelf, a cam mounted in the shaft and engaging the bottom of the shelf, means for turning the shaft to cause said cam to elevate the shelf to bring the terminals of batteries disposed in said recesses into engagement with said contacts, a normally open switch mounted on the bottom of said cross member and controlling supply of electricity to said contacts, and means mounted on said shelf for closing said switch when the shelf is elevated.

GRAHAM BRIGHT.